US012812491B2

(12) United States Patent
Selvaganapathy et al.

(10) Patent No.: US 12,812,491 B2
(45) Date of Patent: Nov. 24, 2026

(54) ENABLING SECONDARY-CELL OPERATION DURING DUAL ACTIVE PROTOCOL STACK HANDOVER

(71) Applicant: Nokia Technologies Oy, Espoo (FI)

(72) Inventors: Srinivasan Selvaganapathy, Bangalore (IN); Amaanat Ali, Espoo (FI); Ahmad Awada, Munich (DE); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 18/696,596

(22) PCT Filed: Oct. 1, 2021

(86) PCT No.: PCT/EP2021/077090

§ 371 (c)(1),
(2) Date: Mar. 28, 2024

(87) PCT Pub. No.: WO2023/051934

PCT Pub. Date: Apr. 6, 2023

(65) Prior Publication Data

US 2024/0397400 A1 Nov. 28, 2024

(51) Int. Cl.
*H04W 36/18* (2009.01)
*H04W 36/00* (2009.01)
(Continued)

(52) U.S. Cl.
CPC ..... *H04W 36/185* (2023.05); *H04W 36/0072* (2013.01); *H04W 36/008355* (2023.05);
(Continued)

(58) Field of Classification Search
CPC ... H04W 36/16; H04W 36/18; H04W 36/185; H04W 36/0005; H04W 36/0055;
(Continued)

(56) References Cited

U.S. PATENT DOCUMENTS

2021/0105671 A1 4/2021 Van Der Velde et al.
2021/0105673 A1 4/2021 Jassal
(Continued)

FOREIGN PATENT DOCUMENTS

EP 2 978 261 A1 1/2016
WO WO 2021/154140 A1 8/2021
WO WO 2021/163089 A1 8/2021

OTHER PUBLICATIONS

Qualcomm, "Source connection handling during DAPS HO", Oct. 14-18, 2019, 3GPP TSG-RAN WG2 Meeting #107bis, R2-1912295, pp. 1-4 (Year: 2019).*

(Continued)

*Primary Examiner* — Paul H. Masur
(74) *Attorney, Agent, or Firm* — Lippes Mathias LLP

(57) ABSTRACT

The present disclosure relates to a technique for enabling secondary-cell (SCell) operation during dual active protocol stack handover (DAPS-HO). For this purpose, a command for the DAPS-HO is modified at a source network node such that it causes a UE to maintain, among an available set of source SCells configured by the source network node for the UE, at least one source SCell active during the DAPS-HO, as well as to activate, among an available set of target SCells configured by a target network node for the UE, at least one target SCell during the DAPS-HO. By using such a modified command for the DAPS-HO, the UE may use the SCells of the source and target network nodes during the DAPS-HO,
(Continued)

thereby resulting in a higher user plane throughput compared to that provided by using the single PCell operation only.

17 Claims, 11 Drawing Sheets

(51) Int. Cl.
*H04W 76/30* (2018.01)
*H04W 36/24* (2009.01)

(52) U.S. Cl.
CPC ........... *H04W 36/18* (2013.01); *H04W 76/30* (2018.02); *H04W 36/249* (2023.05)

(58) Field of Classification Search
CPC ..... H04W 36/0072; H04W 36/008355; H04W 36/24; H04W 36/249; H04W 76/30
See application file for complete search history.

(56) References Cited

U.S. PATENT DOCUMENTS

| | | | | | |
|---|---|---|---|---|---|
| 2021/0105676 | A1 | 4/2021 | Awoniyi-Oteri et al. | | |
| 2021/0111960 | A1 | 4/2021 | Ly et al. | | |
| 2023/0083266 | A1* | 3/2023 | Wu | H04W 36/34 | 370/331 |
| 2023/0108496 | A1* | 4/2023 | Ohlsson | H04W 36/185 | 370/329 |

OTHER PUBLICATIONS

Qualcomm, "Support Tx sharing during DAPS HO", Oct. 14-18, 2019, 3GPP TSG-RAN WG2 Meeting #107bis, R2-1912300, pp. 1-4 (Year: 2019).*

Qualcomm, "Email discussion report for [107#79] [LTE/feMOB] Capability coordination for RUDI HO", Oct. 14-18, 2019, R2-1912821, pp. 1-27 (Year: 2019).*

Nokia, "Report from [AT115-e][024][NR16] DAPS & CHO (Nokia)", Aug. 16-27, 2021, 3GPP TSG-RAN WG2 Meeting #115-e, R2-2109053, pp. 1-21 (Year: 2021).*

PCT/EP2021/077090—ISR Jun. 1, 2022—7 pgs.

PCT/EP2021/077090—WR Opn Jun. 1, 2022—14 pgs.

Intel Corporation, "Report of [AT109e][211][MOB] UE capabilities for DAPS and CHO (Intel)", vol. RAN WG2, No. Elbonia; Feb. 24, 2020-Mar. 6, 2020, Mar. 11, 2020 (Mar. 11, 2020), R2-2001727, URL:https://ftp.3gpp.org/tsg_ran/WG2_RL2/TSGR2_109_e/Docs/R2-2001727.zip R2-2001727 report of [AT109e][211][MOB] V3.docx XP051864471.

Intel corporation Change Request RRC running CR for NO mobility on CHO ([107bis#54]) 3GPP TSG-RAN WG2 Meeting #108 R2-1914834 Reno, USA, Nov. 18-22, 2019.

* cited by examiner

ENABLING SECONDARY-CELL OPERATION DURING DUAL ACTIVE PROTOCOL STACK HANDOVER

TECHNICAL FIELD

The present disclosure relates generally to the field of wireless communications and, in particular, to techniques for enabling secondary-cell operation during Dual Active Protocol Stack Handover (DAPS-HO).

BACKGROUND

In legacy 4th Generation (4G) Long-Term Evolution (LTE) networks and 5th Generation (5G) New-Radio (NR) networks (till 3rd Generation Partnership Project (3GPP) Release 15), a User Equipment (UE) typically releases its connection with a source cell before a new connection is established with a target cell. This process is referred to as conventional handover (HO). According to the conventional HO, uplink (UL) and downlink (DL) transmissions are finalized in the source cell before the UE starts to communicate with the target cell, thereby resulting in an interruption of a few tens of milliseconds in the communication between the UE and a base station serving the target cell. This interruption may be very critical for latency-sensitive communication applications, such, for example, as Ultra-Reliable and Low-Latency Communication (URLCC) applications used in the 5G NR networks.

To solve this problem, a new approach has been introduced in 3GPP Release 16, which is referred to as a DAPS-HO procedure. According to the DAPS-HO procedure, the UE connection with the source cell should remain active for user data reception and transmission until the UE is able to transmit and receive user data in the target cell. This poses a new requirement on the UE to simultaneously receive and transmit the user data in both the source cell and the target cell for a short period of time during the DAPS-HO procedure. The DAPS-HO procedure allows one to reduce the HO-caused user data plane interruption to about 0 ms.

However, according to 3GPP Release 16, the DAPS-HO procedure is restricted to single Primary Cell (PCell) operation in both the source and target cells. A base station (e.g., gNB) serving a source PCell should release all source secondary cells (SCells) before triggering the DAPS-HO procedure for the UE. In turn, if a base station (e.g., gNB) serving a target PCell configures any bearer for the DAPS-HO procedure, it should ensure that no target secondary cells are included in a HO command for the UE. Restricting the UE for the single PCell operation during the DAPS-HO procedure requires multiple signalling overheads because the base station needs to send multiple radio reconfiguration messages to the UE when releasing the SCells prior to the DAPS-HO procedure and configuring them back after the DAPS-HO procedure. These additional steps may also impact the UE throughput depending on available data for transmission at the UE and the base station(s) during the DAPS-HO procedure because the multiple radio reconfiguration messages incur a processing delay at the UE during which user plane communications cannot happen.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that enable secondary-cell operation during DAPS-HO.

The objective above is achieved by the features of the independent claims in the appended claims. Further embodiments and examples are apparent from the dependent claims, the detailed description and the accompanying drawings.

According to a first aspect, a UE for wireless communications is provided. The UE may include at least one processor and at least one memory. The at least one memory may include a computer program code. The at least one memory and the computer program code may be configured to, with the at least one processor, cause the UE to operate at least as follows. At first, the UE is caused to receive, from a source network node, a command for DAPS-HO from a source PCell of the source network node to a target PCell of a target network node. The source network node further comprises a set of source SCells configured for the UE, and the target network node further comprises a set of target SCells configured for the UE. The command for the DAPS-HO causes the UE to: maintain, among the set of source SCells, at least one source SCell active during the DAPS-HO; and activate, among the set of target SCells, at least one target SCell during the DAPS-HO. Then, the UE is caused to execute the DAPS-HO based on the received command for the DAPS-HO. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the Carrier Aggregation (CA) duplication of user plane packets on the SCell(s), which is impossible to perform when only the source and target PCells are allowed in the configuration of the DAPS-HO). On top of that, the possibility of using the SCells during the DAPS-HO allows user plane buffers to be cleared in a wireless communication network much faster than when just the single PCell operation is used. This also improves the latency of user plane transmission and reduces buffering requirements applied in the wireless communication network.

In one example embodiment of the first aspect, the at least one memory and the computer program code may be further configured to, with the at least one processor, cause the UE to receive the command for the DAPS-HO by using a dedicated signaling (e.g., a Radio Resource Control (RRC) message) from the source network node. By so doing, it is possible to efficiently provide the command for the DAPS-HO to the UE.

In one example embodiment of the first aspect, the at least one memory and the computer program code may be further configured to, with the at least one processor, cause the UE to execute the DAPS-HO by performing a random access procedure for the target PCell. After the random access procedure is successfully completed, the UE is caused to receive a release message for the source PCell from the target network node and, in response to the release message, release the source PCell and the at least one source SCell. By so doing, it is possible to efficiently execute the DAPS-HO in response to the command for DAPS-HO from the source network node.

In one example embodiment of the first aspect, the command for the DAPS-HO causes the UE to maintain, among the set of source SCells, a first subset of source SCells active upon receiving the command for the DAPS-HO until the random access procedure for the target PCell is successfully completed. In this embodiment, the command for the DAPS-HO further causes the UE to maintain, among the set of source SCells, a second subset of source SCells active after the successfully completed random access procedure until the release message for the source PCell is received from the target network node. By so doing, it is possible to enable the source SCells during the DAPS-HO in a flexible manner.

In one example embodiment of the first aspect, the first subset of source SCells is the same as the second subset of source SCells. This may simplify the source-SCell selection during the DAPS-HO.

In another example embodiment of the first aspect, the second subset of source SCells is part of the first subset of source SCells. This may simplify the source-SCell selection during the DAPS-HO.

In one example embodiment of the first aspect, the command for the DAPS-HO causes the UE to configure a subset of target SCells from the set of target SCells upon receiving the command for the DAPS-HO, and to activate the subset of target SCells after the successfully completed random access procedure. In this embodiment, the command for the DAPS-HO further causes the UE to activate the remaining target SCells from the set of target SCells command upon receiving the release message for the source PCell from the target network node. By so doing, it is possible to enable the target SCells during the DAPS-HO in a flexible manner.

In another example embodiment of the first aspect, the command for the DAPS-HO causes the UE to configure and activate the set of target SCells during the DAPS-HO. By so doing, it is possible to enable the target SCells during the DAPS-HO in a flexible manner.

In one example embodiment of the first aspect, the at least one memory and the computer program code may be further configured to, with the at least one processor, cause the UE, before receiving the command for the DAPS-HO, to: receive, from the source network node or the target network node, a request for a UE capability that comprises: (i) a maximum number of SCells that the UE is able to maintain active simultaneously, and/or (ii) at least one SCell combination that the UE is able to maintain; and report the UE capability to the source network node or the target network node. By so doing, it is possible to ensure that the SCells will be involved during the DAPS-HO more efficiently in a UE-specific manner.

In one example embodiment of the first aspect, the command for the DAPS-HO comprises a SCell combination table that comprises multiple SCell combinations configured for the UE. Each of the multiple SCell combinations comprises at least one source SCell of the set of source SCells and at least one target SCell of the set of target SCells. In this embodiment, the at least one memory and the computer program code may be further configured to, with the at least one processor, cause the UE to: select, among the multiple SCell combinations, a SCell combination for the DAPS-HO; maintain the at least one source SCell of the selected SCell combination active during the DAPS-HO; and activate the at least one target SCell of the selected SCell combination during the DAPS-HO. The SCell combination table may allow the UE to select the source and target SCells for the DAPS-HO in a faster and more reliable manner.

In one example embodiment of the first aspect, each of the multiple SCell combinations is provided with a table index in the SCell combination table. In this embodiment, the at least one memory and the computer program code may be further configured to, with the at least one processor, cause the UE to select the SCell combination for the DAPS-HO by receiving, from the source network node or the target network node, a selected table index among the table indices of the SCell combination table and selecting the SCell combination for the DAPS-HO based on the selected table index. By so doing, it is possible to instruct the UE to use a desired SCell combination from the SCell combination table.

In one example embodiment of the first aspect, the at least one memory and the computer program code may be further configured to, with the at least one processor, cause the UE to notify the target network node about the selected table index if the selected table index is received from the source network node. The target network node may use this information to decide whether to switch the selected SCell combination to another one the prior to the source PCell release, if required (e.g., more dynamically depending on the radio conditions of the selected source and target SCells).

In one example embodiment of the first aspect, the at least one memory and the computer program code may be further configured to, with the at least one processor, cause the UE to receive the selected table index by using a Media Access Control (MAC)-Control Element (CE). The MAC-CE may be advantageously used when the source and target network nodes are co-located within the same network node.

According to a second aspect, a source network node in a wireless communication network is provided. The source network node may include at least one processor and at least one memory. The at least one memory may include a computer program code. The at least one memory and the computer program code may be configured to, with the at least one processor, cause the source network node to operate as follows. At first, the source network node is caused to provide, to a target network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. Further, the source network node is caused to receive a DAPS-HO request acknowledgement from the target network node. The DAPS-HO request acknowledgement comprises: (i) at least one target SCell of the set of target SCells which the UE is to activate during the DAPS-HO, and (ii) an indication of whether the source network node is to replace the at least one source SCell comprised in the request for the DAPS-HO with at least another source SCell of the set of source SCells. After that, the source network node is caused to generate a command for the DAPS-HO based on the DAPS-HO request acknowledgement. The command for the DAPS-HO indicates: (i) the at least one target SCell, and (ii) the at least one source SCell or the at least another source SCell. Next, the source network node is caused to transmit the command for the DAPS-HO to the UE. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS- HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in the wireless communication network much faster than when just the single PCell operation is used. This also improves the latency of user plane transmission and reduces buffering requirements applied in the wireless communication network.

In one example embodiment of the second aspect, the at least one memory and the computer program code may be further configured to, with the at least one processor, cause the source network node to transmit the command for the DAPS-HO by using a dedicated signaling (e.g., a RRC message) to the UE. By so doing, it is possible to efficiently provide the command for the DAPS-HO to the UE.

In one example embodiment of the second aspect, the at least one memory and the computer program code may be further configured to, with the at least one processor, cause the source network node, before transmitting the request for the DAPS-HO to the target network node, to: transmit, to the UE, a request for a UE capability that comprises: (i) a maximum number of SCells that the UE is able to maintain active simultaneously, and/or (ii) at least one SCell combination that the UE is able to maintain; and receive a report on the UE capability from the UE. By so doing, it is possible to ensure that the SCells will be involved during the DAPS-HO more efficiently in a UE-specific manner.

In one example embodiment of the second aspect, the at least one source SCell comprises a first subset of source SCells which the UE is to maintain active upon receiving the command for the DAPS-HO until a random access procedure for the target PCell is successfully completed in accordance with the DAPS-HO. In this embodiment, the at least one source SCell further comprises a second subset of source SCells which the UE is to maintain active after the successfully completed random access procedure until the UE receives a release message for the source PCell from the target network node in accordance with the DAPS-HO. By so doing, it is possible to enable the source SCells during the DAPS-HO in a flexible manner.

In one example embodiment of the second aspect, the first subset of source SCells is the same as the second subset of source SCells. This may simplify the source-SCell selection during the DAPS-HO.

In one example embodiment of the second aspect, the second subset of source SCells is part of the first subset of source SCells. This may simplify the source-SCell selection during the DAPS-HO.

In one example embodiment of the second aspect, the at least one target SCell comprises a subset of target SCells which the UE is to configure upon receiving the command for the DAPS-HO and activate after the successfully completed random access procedure. In this embodiment, the command for the DAPS-HO further causes the UE to activate the remaining target SCells from the set of target SCells upon receiving the release message for the source PCell from the target network node. By so doing, it is possible to enable the target SCells during the DAPS-HO in a flexible manner.

In another example embodiment of the second aspect, the command for the DAPS-HO causes the UE to activate the set of target SCells during the DAPS-HO. By so doing, it is possible to enable the target SCells during the DAPS-HO in a flexible manner.

In one example embodiment of the second aspect, the DAPS-HO request acknowledgement further indicates a SCell combination table that comprises multiple SCell combinations configured for the UE. Each of the multiple SCell combinations comprises at least one source SCell of the set of source SCells and at least one target SCell of the set of target SCells. In this embodiment, the at least one memory and the computer program code may be further configured to, with the at least one processor, cause the source network node to include the SCell combination table in the command for the DAPS-HO. The SCell combination table may allow the UE to select the source and target SCells for the DAPS-HO in a faster and more reliable manner.

In one example embodiment of the second aspect, each of the multiple SCell combinations is provided with a table index in the SCell combination table. In this embodiment, the at least one memory and the computer program code may be further configured to, with the at least one processor, cause the source network node to: select a table index among the table indices of the SCell combination table (e.g., based on the maximum number of SCells that the UE is able to maintain active simultaneously); and indicate the selected table index in the command for the DAPS-HO, or transmit the selected table index to the UE by using a MAC-CE. By so doing, it is possible to instruct the UE to use a desired SCell combination from the SCell combination table. Moreover, the MAC-CE may be advantageously used when the target and source network nodes are co-located within the same network node.

According to a third aspect, a target network node in a wireless communication network is provided. The target network node may include at least one processor and at least one memory. The at least one memory may include a computer program code. The at least one memory and the computer program code may be configured to, with the at least one processor, cause the target network node to operate at least as follows. At first, the target network node is caused to receive, from a source network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. Further, the target network node is caused, in response to the request for the DAPS-HO, to select at least one target SCell of the set of target SCells which the UE is to activate during the DAPS-HO, and decide whether to replace the at least one source SCell indicated in the request for the DAPS-HO with at least another source SCell of the set of source SCells based on a UE capability pre-reported by the source network node or the UE. The UE capability comprises: (i) a maximum number of SCells that the UE is able to maintain active simultaneously, and/or (ii) at least SCell combination that the UE is able to maintain. After that, the target network node is caused to provide a DAPS-HO request acknowledgement to the source network node. The DAPS-HO request acknowledgement comprises: (i) the at least one target SCell, and (ii) an indication of whether the source network node is to replace the at least one source SCell with the at least another source SCell. By so doing, it is possible to enable the SCell operation during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in the wireless communication network much faster than when just the single PCell operation is used. This also improves the latency of user plane transmission and reduces buffering requirements applied in the wireless communication network.

In one example embodiment of the third aspect, the at least one target SCell comprises a subset of target SCells of the set of target SCells. By so doing, it is possible to enable the target SCells during the DAPS-HO in a flexible manner.

In another example embodiment of the third aspect, the at least one target SCell comprises the set of target SCells. By so doing, it is possible to enable the target SCells during the DAPS-HO in a flexible manner.

In one example embodiment of the third aspect, the at least one memory and the computer program code may be further configured to, with the at least one processor, cause the target network node to use the request for the DAPS-HO to generate a SCell combination table that comprises multiple SCell combinations configured for the UE. Each of the multiple SCell combinations comprises at least one source SCell of the set of source SCells and at least one target SCell of the set of target SCells. The target network node may be then caused to include the SCell combination table in the DAPS-HO request acknowledgement. The SCell combination table may be then forwarded to the UE, so that the UE may select the source and target SCells for the DAPS-HO in a faster and more reliable manner.

In one example embodiment of the third aspect, each of the multiple SCell combinations is provided with a table index in the SCell combination table. In this embodiment, the at least one memory and the computer program code may be further configured to, with the at least one processor, cause the target network node to receive a table index selected among the table indices of the SCell combination table from the UE or the source network node. Then, the target network node is caused to decide whether to switch from the selected table index to another table index among the table indices of the SCell combination table based on a current radio condition in the set of source SCells and the set of target SCells. After that, the target network node is caused to transmit an indication of said another table index to the UE or the source network node if it is required to switch from the selected table index to said another table index. By so doing, it is possible to instruct the UE to switch between the SCell combinations from the SCell combination table, if required.

In one example embodiment of the third aspect, the at least one memory and the computer program code may be further configured to, with the at least one processor, cause the target network node to receive the selected table index and transmit the indication of said another table index by using a MAC-CE. The MAC-CE may be advantageously used when the source and target network nodes are co-located within the same network node.

According to a fourth aspect, a method for operating a UE for wireless communications is provided. The method starts with the step of receiving, from a source network node, a command for DAPS-HO from a source PCell of the source network node to a target PCell of a target network node. The source network node further comprises a set of source SCells configured for the UE, and the target network node further comprises a set of target SCells configured for the UE. The command for the DAPS-HO causes the UE to: maintain, among the set of source SCells, at least one source SCell active during the DAPS-HO; and activate, among the set of target SCells, at least one target SCell during the DAPS-HO. Then, the method proceeds to the step of executing the DAPS-HO based on the received command for the DAPS-HO. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in a wireless communication network much faster than when just the single PCell operation is used. This also improves the latency of user plane transmission and reduces buffering requirements applied in the wireless communication network.

According to a fifth aspect, a method for operating a source network node in a wireless communication network is provided. The method starts with the step of providing, to a target network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. Then, the method proceeds to the step of receiving a DAPS-HO request acknowledgement from the target network node. The DAPS-HO request acknowledgement comprises: (i) at least one target SCell of the set of target SCells which the UE is to activate during the DAPS-HO, and (ii) an indication of whether the source network node is to replace the at least one source SCell with at least another source SCell of the set of source SCells. After that, the method goes on to the step of generating a command for the DAPS-HO based on the DAPS-HO request acknowledgement. The command for the DAPS-HO indicates: (i) the at least one target SCell, and (ii) the at least one source SCell or the at least another source SCell. Next, the method proceeds to the step of transmitting the command for the DAPS-HO to the UE. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in a wireless communication network much faster than when just the single PCell operation is used. This also improves the latency of user plane transmission and reduces buffering requirements applied in the wireless communication network.

According to a sixth aspect, a method for operating a target network node in a wireless communication network is provided. The method starts with the step of receiving, from a source network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. Then, the method proceeds to the step of using the request for the DAPS-HO to select at least one target SCell of the set of target SCells which the UE is to activate during the DAPS-HO and decide whether to replace the at least one source SCell with at least another source SCell of the set of source SCells based on a UE capability pre-reported by the source network node or the UE. The UE capability comprises: (i) a maximum number of SCells that the UE is able to maintain active simultaneously, and/or (ii) at least SCell combination that the UE is able to maintain. After that, the method goes on to the step of providing a DAPS-HO request acknowledgement to the source network node. The DAPS-HO request acknowledgement comprises: (i) the at least one target SCell, and (ii) an indication of whether the source network node is to replace the at least one source SCell with the at least another SCell. By so doing, it is possible to enable the SCell operation during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in the wireless communication network much faster than when just the single PCell operation is used. This also improves the latency of user plane transmission and reduces buffering requirements applied in the wireless communication network.

According to a seventh aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any UE, like the UE according to the first aspect.

According to an eighth aspect, a computer program product is provided. The computer program product comprises a computer-readable storage medium that stores a computer code. Being executed by at least one processor, the computer code causes the at least one processor to perform the method according to the fifth aspect. By using such a computer program product, it is possible to simplify the implementation of the method according to the fifth aspect in any network node, like the network node according to the second aspect.

According to a ninth aspect, a computer program product is provided. The computer program product comprises a computer-readable storage medium that stores a computer code. Being executed by at least one processor, the computer code causes the at least one processor to perform the method according to the sixth aspect. By using such a computer program product, it is possible to simplify the implementation of the method according to the sixth aspect in any network node, like the network node according to the third aspect.

According to a tenth aspect, a UE for wireless communications is provided. The UE comprises a means for receiving, from a source network node, a command for DAPS-HO from a source PCell of the source network node to a target PCell of a target network node. The source network node further comprises a set of source SCells configured for the UE, and the target network node further comprises a set of target SCells configured for the UE. The command for the DAPS-HO causes the UE to: maintain, among the set of source SCells, at least one source SCell active during the DAPS-HO; and activate, among the set of target SCells, at least one target SCell during the DAPS-HO. The UE further comprises a means for executing the DAPS-HO based on the received command for the DAPS-HO. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in a wireless communication network much faster than when just the single PCell operation is used. This also improves the latency of user plane transmission and reduces buffering requirements applied in the wireless communication network.

According to an eleventh aspect, a source network node in a wireless communication network is provided. The source network node comprises a means for providing, to a target network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. The source network node further comprises a means for receiving a DAPS-HO request acknowledgement from the target network node. The DAPS-HO request acknowledgement comprises: (i) at least one target SCell of the set of target SCells which the UE is to activate during the DAPS-HO, and (ii) and indication of whether the source network node is to replace the at least one source SCell comprised in the request for the DAPS-HO with at least another source SCell of the set of source SCells. The source network node further comprises a means for generating a command for the DAPS-HO based on the DAPS-HO request acknowledgement. The command for the DAPS-HO indicates: (i) the at least one target SCell, and (ii) the at least one source SCell or the at least another source SCell. The source network node further comprises a means for transmitting the command for the DAPS-HO to the UE. By using such a command for the DAPS-HO, the UE may use the SCells of the source and target network nodes during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in the wireless communication network much faster than when just the single PCell operation is used. This also improves the latency of user plane transmission and reduces buffering requirements applied in the wireless communication network.

According to a twelfth aspect, a target network node in a wireless communication network is provided. The target network node comprises a means for receiving, from a source network node, a request for DAPS-HO for a UE from a source PCell of the source network node to a target PCell of the target network node. The source network node further comprises a set of source SCells configured for the UE, and the target network node further comprises a set of target SCells configured for the UE. The request for the DAPS-HO comprises at least one source SCell of the set of source SCells which the UE is to maintain active during the DAPS-HO. The target network node further comprises a means for selecting, in response to the request for the DAPS-HO, at least one target SCell of the set of target SCells which the UE is to activate during the DAPS-HO, as well as a means for deciding, in response to the request for the DAPS-HO, whether to replace the at least one source SCell indicated in the request for the DAPS-HO with at least another source SCell of the set of source SCells based on a UE capability pre-reported by the source network node or the UE. The UE capability comprises: (i) a maximum number of SCells that the UE is able to maintain active simultaneously, and/or (ii) at least SCell combination that the UE is able to maintain. The target network node further comprises a means for providing a DAPS-HO request acknowledgement to the source network node. The DAPS-HO request acknowledgement comprises: (i) the at least one target SCell, and (ii) an indication of whether the source network node is to replace the at least one source SCell with the at least another source SCell. By so doing, it is possible to enable the SCell operation during the DAPS-HO, thereby resulting in a higher user plane throughput compared to that provided by using the single PCell operation only. Moreover, the possibility of using the SCells during the DAPS-HO also allows for improved recovery procedures in case of any failures that may occur during the DAPS-HO (e.g., by allowing the source and/or target network node to perform the CA duplication of user plane packets on the SCell(s), which is impossible to perform when only the source and target PCell are allowed in the configuration of the DAPS-HO). On top of that, the possibility of using the SCells during the DAPS-HO allows user plane buffers to be cleared in the wireless communication network much faster than when just the single PCell operation is used. This also improves the latency of user plane transmission and reduces buffering requirements applied in the wireless communication network.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Figure 1:
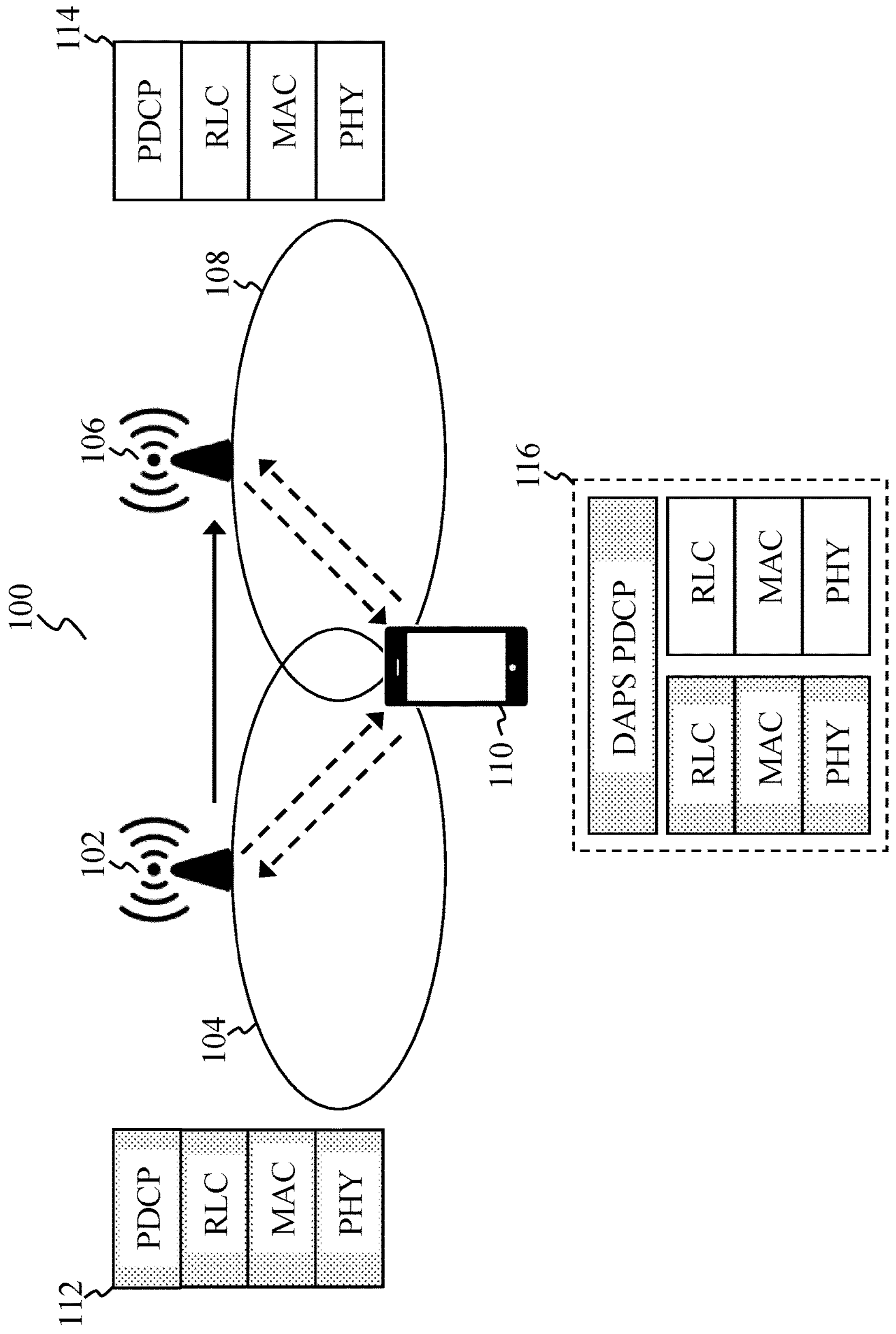
FIG. 1 shows a block diagram of a wireless communication system in which the conventional DAPS-HO procedure takes place.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

Although the numerative terminology, such as "first", "second", "third", "fourth", etc., may be used herein to describe various embodiments or features, it should be understood that these embodiments or features should not be limited by this numerative terminology. This numerative terminology is used herein only to distinguish one embodiment or feature from another embodiment or feature. For example, in the embodiments disclosed herein, a first subset of source SCells could be renamed a second subset of source SCells, and vice versa, without departing from the teachings of the present disclosure.

According to the example embodiments disclosed herein, a User Equipment (UE) may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication for a UE in a particular wireless communication network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

It should be also noted that, in the embodiments disclosed herein, the term "cell" may refer not only to a geographic area or coverage within which one or more nodes provide a wireless communication service by using a carrier, but also to radio resources (e.g., time-frequency resources). In the latter case, the cell may be associated with a bandwidth which is a frequency range configured by the carrier. Being associated with the radio resources, the cell is defined by a combination of DL resources and UL resources, for example, a combination of a DL Component Carrier (CC) and an UL CC. In case of Carrier Aggregation (CA), two or more CCs are aggregated. The UE may simultaneously receive or transmit on one or multiple CCs depending on its capabilities. The CA is supported for both contiguous and non-contiguous CCs. When the CA is configured, the UE only has one RRC connection in a wireless communication network. At RRC connection establishment/re-establishment/handover (HO), one serving cell provides non-access stratum (NAS) mobility information, and at RRC connection re-establishment/HO, one serving cell provides a security input. This cell is referred to as a Primary Cell (PCell). The PCell is a cell operating on a primary frequency, in which the UE either performs an initial connection establishment procedure or initiates a connection re-establishment procedure. Depending on the UE capabilities, Secondary Cells (SCells) may be also configured to form, together with the PCell, a set of serving cells. An SCell is a cell providing additional radio resources on top of the PCell. In general, the configured set of serving cells for the UE may consist of one PCell and one or more SCells. Thus, as used in the embodiments disclosed herein, the phrases like "a UE releases some SCells and activate other SCells" may mean that the UE releases the radio resources associated with said some SCells and activates (or starts employing) the radio resources associated with said other SCells. At the same time, instead of releasing SCells, a UE may also deactivate them, which means that the UE simply stops monitoring a DL for any data and stops transmission in an UL (but the SCells are not released in this case, i.e., the radio resources associated with the SCells are still employed by the UE). Such a SCell deactivation is also intended to fall within the scope of the present disclosure.

According to the example embodiments disclosed herein, a wireless communication network, in which a UE and a network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

One of the goals in mobility enhancement in a wireless communication network is to accomplish little to no interruption time when performing HO for a UE from a source cell to a target cell. Such reduced interruption time may be achieved by using the DAPS-HO procedure introduced in 3GPP Release 16. As part of this conventional DAPS-HO procedure, the UE simultaneously configures two protocol stack (PS) instances with source and target cells to enable transmission/reception via both the cells.

FIG. 1 shows a block diagram of a wireless communication system 100 in which the conventional DAPS-HO procedure takes place. The system 100 comprises a source gNB 102 serving a source cell 104 and a target gNB 106 serving a target cell 108. The DAPS-HO procedure is initiated by the source gNB 102 when a UE 110 (e.g., a smartphone) is at the edge of the source cell 104, so that the radio condition measured and reported by the UE 110 to the source gNB 102 are not good enough to continue wireless communications in the source cell 104. In this case, the source gNB 102 may request the DAPS-HO of the UE 110 to the target gNB 106 (see the solid black arrow in FIG. 1). It should be noted that, before the DAPS-HO procedure is initiated, the gNBs 102 and 106 configure their own user plane protocol stacks 112 and 114, respectively, for the UE 110. Each of the protocol stacks 112 and 114 may consist of a Physical layer (PHY), a Medium Access Control (MAC) layer, a Radio Link Control (RLC) layer, and a Packet Data Convergence Protocol (PDCP) layer. Each of these layers are well-known in the art, for which reason their description is omitted herein.

As follows from FIG. 1, to support the DAPS-HO, the UE 110 has to keep a dual protocol stack 116 in an active state. In other words, the UE 110 should start using the protocol stack 114 in the target cell 108, while keeping the protocol stack 112 active for user data transmission and reception in the source cell 104. To transmit and receive user data simultaneously in both the source cell 104 and the target cell 108 (see the dashed black arrows in FIG. 1), the PDCP layer of the protocol stack 112 is reconfigured to be a common DAPS PDCP entity for the protocol stacks 112 and 114. To secure in-sequence delivery of user data, PDCP Sequence Number (SN) continuation is maintained throughout the DAPS-HO procedure. For this reason, a common (for the source and target cells 104 and 106) re-ordering and duplication function is provided in the single PDCP entity. Ciphering/deciphering and header compression/decompression need to be handled separately in the common PDCP entity, depending on the origin/destination of DL/UL data packets (i.e. separately for the source and target protocol stacks 112 and 114).

Figure 2:
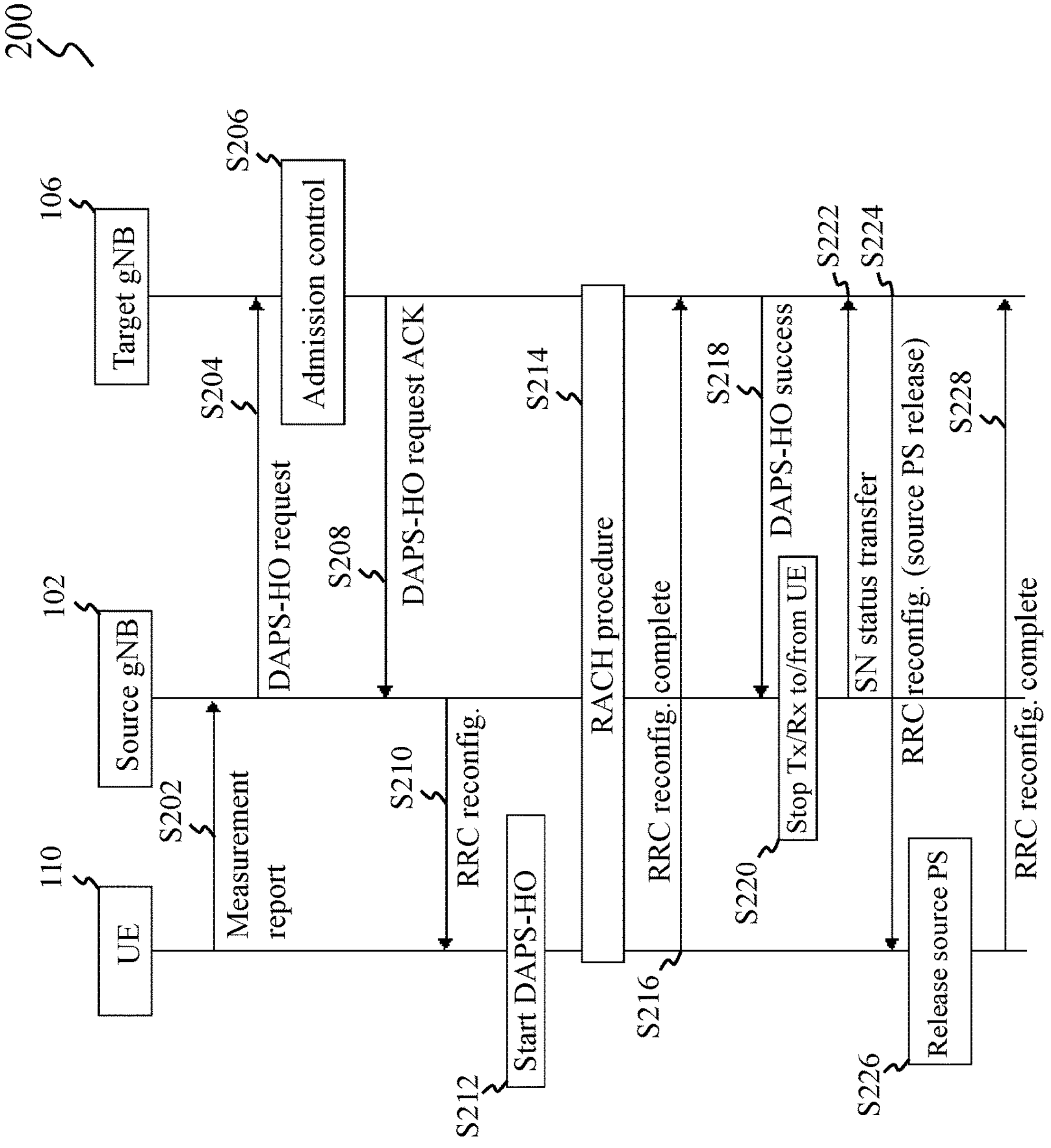
FIG. 2 shows an interaction diagram that explains the interaction between a UE, a source network node and a target network node, which are shown in FIG. 1, during the conventional DAPS-HO procedure.

FIG. 2 shows an interaction diagram 200 that explains the interaction between the UE 110, the source network node 102 and the target network node 106 during the conventional DAPS-HO procedure. The interaction diagram 200 starts with a step S202, in which the source gNB 102 configures measurement procedures for the UE 110 and the UE 110 reports a measurement report according to the configured measurement procedures. The source gNB 102 decides to initiate the DAPS-HO of the UE 110 based on the measurement report (and Radio Resource Management (RRM) information, if available). The source gNB 102 sends a DAPS-HO request to the target gNB 106 in a step S204. The DAPS-HO request comprises a transparent RRC container with necessary information to prepare the DAPS-HO at the target gNB 106. The target gNB 106 uses to this information to perform DAPS-HO admission control in a step S206. Further, the interaction diagram 200 proceeds to a step S208, in which the target gNB 106 prepares and sends a DAPS-HO request acknowledgement to the source gNB 102, which comprises a transparent container to be sent to the UE 110 as an RRC reconfiguration message to execute the DAPS-HO. The target gNB 106 also indicates if the DAPS-HO for the UE 110 is accepted. In a next step S210, the source gNB 102 triggers the DAPS-HO by sending the RRC Reconfiguration message to the UE 110 (i.e., a command for the DAPS-HO). In response to the RRC reconfiguration message, the UE 110 starts the DAPS-HO in a step S212. After that, the interaction diagram 200 goes on to a step S214, in which the UE 110 performs a RACH procedure for the target gNB 106 (or, in other words, synchronizes to the target cell 108). Then, in a next step S216, when the RACH procedure is successfully performed, the UE 110 sends an RRC reconfiguration complete message to the target gNB 106. Further, in a step S218, the target gNB 106 sends a DAPS-HO success message to the source gNB 102 to inform that the UE 110 has successfully accessed the target cell 108. In response to the DAPS-HO success message, the source gNB 102 stops all user data transmission/reception to/from the UE 110 in a step S220. Next, in a step S222, the source gNB 102 sends an SN status transfer message for Data Radio Bearers (DRBs) configured for the DAPS. The SN status transfer message informs the target gNB 106 from which packet it should receive or send. When the target gNB 106 receives the SN status transfer message, it prepares and sends a new RRC reconfiguration message to the UE 110 in a step S224. The new RRC reconfiguration message causes the UE 110 to release the protocol stack 112 of the source gNB 102 (or, in other words, the source cell 104). The UE 110 releases the protocol stack 112 in a step S226 and sends an RRC reconfiguration complete message indicative of said release to the target gNB 106 in a step S228. After that, the interaction diagram 200 ends up, i.e., the DAPS-HO procedure is completed.

However, the conventional DAPS-HO procedure described above suffers from the following drawback: If each of the source gNBs 102 and the target gNB 106 uses the CA (i.e., serves a PCell and at least one SCell), all the SCells should be released before triggering the DAPS-HO to the UE 110. This is because only the PCells of the source gNB 102 and the target gNB 106 are used during the conventional DAPS-HO procedure (this restriction is specified in TS38.00 Section 9.2.3.1). Thus, at least one more RRC reconfiguration message is required to add the SCells to the PCell of the target gNB 106 after the protocol stack 112 is released, or the addition of the SCells may be indicated in the RRC reconfiguration message sent in the step 224 (which is the earliest time to add any SCells following the DAPS HO). Anyway, restricting the UE 110 for single PCell operation (at both source and target) during the DAPS-HO requires multiple signalling overheads caused by releasing the SCells prior to the DAPS-HO and configuring them back after the DAPS-HO. These additional steps may adversely impact the UE throughput.

The example embodiments disclosed herein provide a technical solution that allows mitigating or even eliminating the above-sounded drawbacks peculiar to the prior art. In particular, the technical solution disclosed herein enables SCell operation during the DAPS-HO. For this purpose, a command for the DAPS-HO is modified at a source network node such that it causes a UE to maintain, among an available set of source SCells configured by the source network node for the UE, at least one source SCell active during the DAPS-HO, as well as activate, among an available set of target SCells configured by a target network node for the UE, at least one target SCell during the DAPS-HO. By using such a modified command for the DAPS-HO, the UE may use the SCells of the source and target network nodes during the DAPS-HO, thereby resulting in a higher user plane throughput compared to that provided by using the single PCell operation only.

Figure 3:
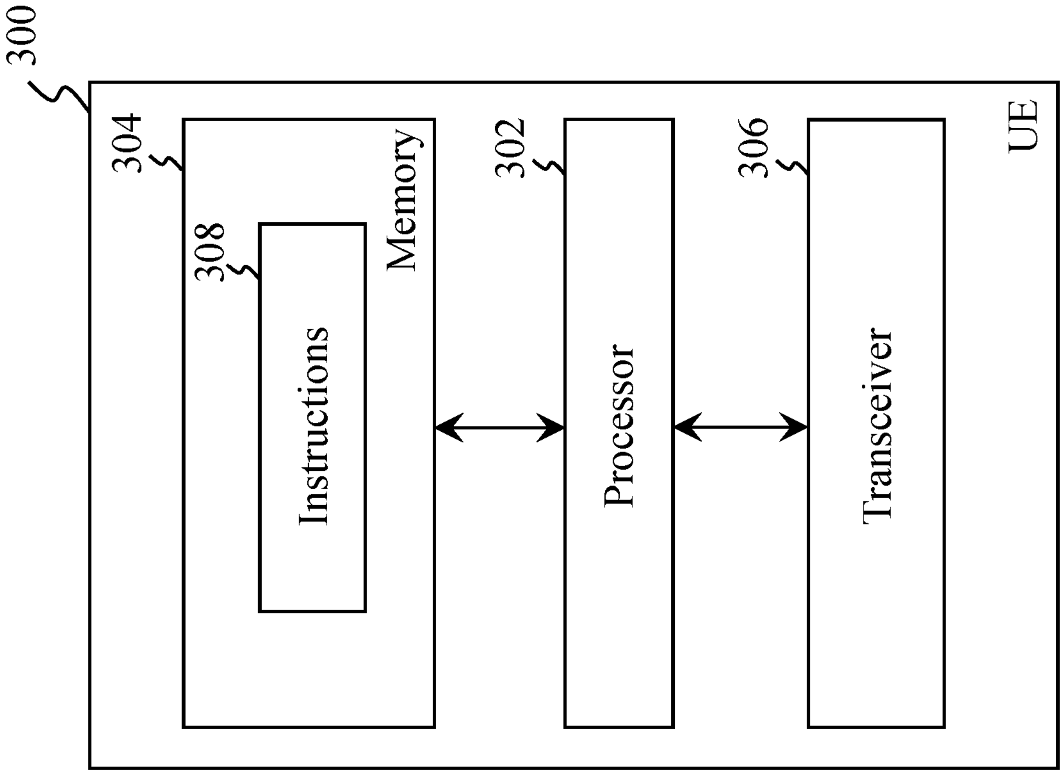
FIG. 3 shows a block diagram of a UE in accordance with one example embodiment.

FIG. 3 shows a block diagram of a UE 300 in accordance with one example embodiment. The UE 300 is intended to operate in any of the above-described wireless communication networks. As shown in FIG. 3, the UE 300 comprises a processor 302, a memory 304, and a transceiver 306. The memory 304 stores processor-executable instructions 308 which, when executed by the processor 302, cause the processor 302 to implement the aspects of the present disclosure, as will be described below in more detail. It should be noted that the number, arrangement, and interconnection of the constructive elements constituting the UE 300, which are shown in FIG. 3, are not intended to be any limitation of the present disclosure, but merely used to provide a general idea of how the constructive elements may be implemented within the UE 300. For example, the processor 302 may be replaced with several processors, as well as the memory 304 may be replaced with several removable and/or fixed storage devices, depending on particular applications. Furthermore, in some embodiments, the transceiver 306 may be implemented as two individual devices, with one for a receiving operation and another for a transmitting operation. Irrespective of its implementation, the transceiver 306 is intended to be capable of performing different operations required to perform the data reception and transmission, such, for example, as signal modulation/demodulation, encoding/decoding, etc. In other embodiments, the transceiver 306 may be part of the processor 302 itself.

The processor 302 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 302 may be implemented as any combination of one or more of the aforesaid. As an example, the processor 302 may be a combination of two or more microprocessors.

The memory 304 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 308 stored in the memory 304 may be configured as a computer-executable code which causes the processor 302 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 304) on the fly.

Figure 4:
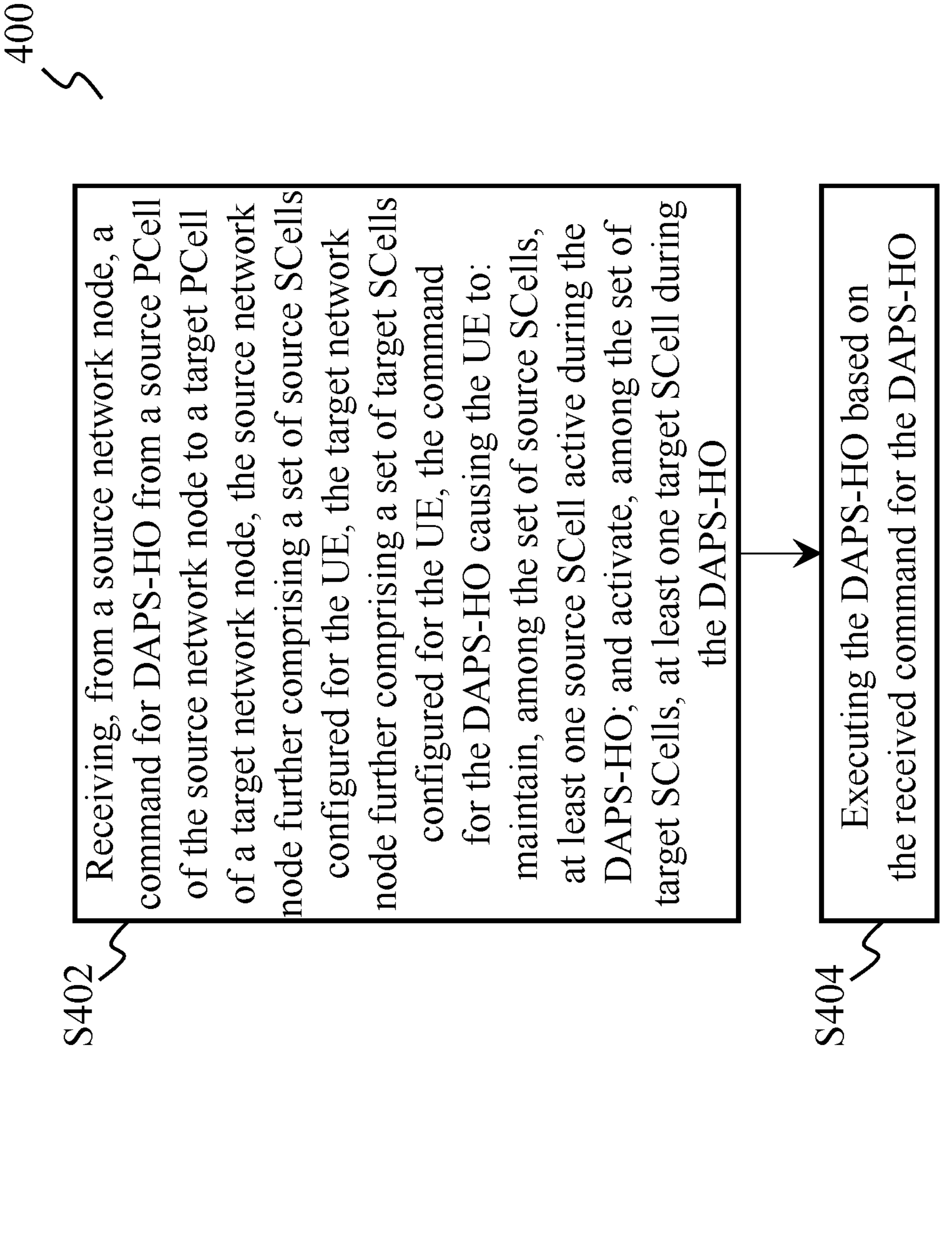
FIG. 4 shows a flowchart of a method for operating the UE shown in FIG. 3 in accordance with a first example embodiment.

FIG. 4 shows a flowchart of a method 400 for operating the UE 300 in accordance with one example embodiment. The method 400 starts with a step S402, in which the processor 302 receives, from a source network node, a command for DAPS-HO from a source PCell of the source network node to a target PCell of a target network node. The step S402 may be performed by using a dedicated signaling (e.g., an RRC message). It is assumed that the source network node further comprises a set of source SCells configured for the UE 300, and the target network node further comprises a set of target SCells configured for the UE 3. The command for the DAPS-HO causes the UE 300 to maintain, among the set of source SCells, at least one source SCell active during the DAPS-HO (in addition to the source PCell), as well as activate, among the set of target SCells, at least one target SCell during the DAPS-HO (in addition to the target PCell). Then, the method 400 proceeds to a step S404, in which the processor 302 executes the DAPS-HO based on the received command for the DAPS-HO.

In one example embodiment, the method 400 may comprise, before the step S402, an additional step, in which the processor 302 receives, from the source network node or the target network node, a request for a UE capability. The UE capability implies: (i) a maximum number of SCells that the UE 300 may maintain active during the DAPS-HO, and/or (ii) at least one SCell combination that the UE 300 may maintain during the DAPS-HO. In response to the request, the UE 300 may report the UE capability to the source network node or the target network node. By so doing, it is possible to properly enable the SCell operation for the UE 300 during the DAPS-HO.

In one example embodiment, the step S404 may be performed as follows. At first, the processor 302 performs a random access procedure (like the RACH procedure performed in the step S214 of the interaction diagram 200) for the target PCell. After the random access procedure is successfully completed, the processor 302 receives a release message for the source PCell (like the RRC reconfiguration message sent in the step S224 of the interaction diagram 200) from the target network node. In response to the release message, the processor 302 releases the source PCell and the at least one source SCell indicated in the command for the DAPS-HO.

In one example embodiment, the command for the DAPS-HO may cause the UE 300 to maintain, among the set of source SCells, a first subset of source SCells active upon receiving the command for the DAPS-HO until the random access procedure for the target PCell is successfully completed. In this embodiment, the command for the DAPS-HO may further cause the UE 300 to maintain, among the set of source SCells, a second subset of source SCells active after the successfully completed random access procedure until the release message for the source PCell is received from the target network node. The second subset of source SCells may be either the same as the first subset of source SCells, or be part of the first subset of source SCells. By so doing, it is possible to enable the source SCells during the DAPS-HO in a flexible manner.

As for the target SCell(s), in one example embodiment, the command for the DAPS-HO may cause the UE 300 to configure a subset of target SCells from the set of target SCells upon receiving the command for the DAPS-HO, and to activate the subset of target SCells after the successfully completed random access procedure. In this embodiment, the command for the DAPS-HO further causes the UE to activate the remaining target SCells from the set of target SCells upon receiving the release message for the source PCell from the target network node. In another example embodiment, the command for the DAPS-HO may cause the UE 300 to configure and activate the set of target SCells during the DAPS-HO. By so doing, it is also possible to enable the target SCells during the DAPS-HO in a flexible manner.

Figure 5:
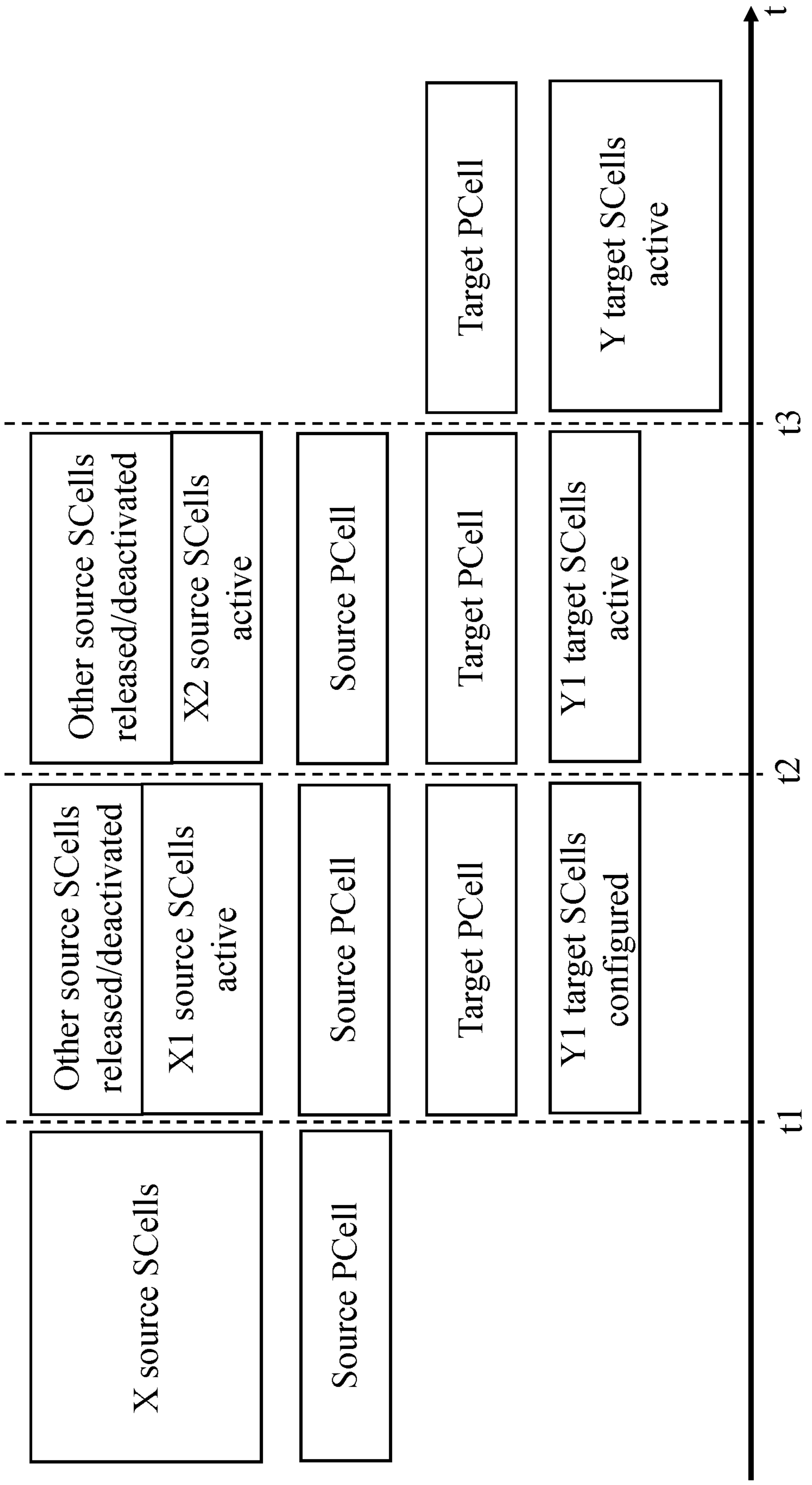
FIG. 5 schematically explains how SCell operations may change during DAPS-HO.

FIG. 5 schematically explains how SCell operations may change during the DAPS-HO. It is assumed that the source network node initially configures a source PCell and a set of X source SCells for the UE 300. It is further assumed that the DAPS-HO should be executed from the source PCell to the target PCell of the target network node. The target network node also needs (upon the completed DAPS-HO) to configure a set of Y target SCells for the UE 300. In FIG. 5, t1 corresponds to a time instant at which the UE 300 receives the command for the DAPS-HO from the source network node, t2 corresponds to a time instant at which the random access procedure for the target PCell is completed, and t3 corresponds to a time instant at which the RRC reconfiguration message related to the release of the source PCell (or, in other words, the protocol stack (PS)) of the source network node is received. The command for the DAPS-HO is assumed to indicate the following parameters:

- a subset X1 ($X1 \subset X$) of source SCells which may be continued (i.e., maintained active) upon receiving the command for the DAPS-HO until the random access procedure for the target PCell is completed (the remaining source SCells should be released or deactivated);
- a subset X2 ($X2 \subset X1$, or $X2 \subset X$, or $X2=X1$) of source SCells which may be active longer than until the completion of the random access procedure (DAPS-HO success), i.e., until the PS of the source network node is released;
- the set Y of target SCells which should be configured and activated by the UE 300 after the PS of the source network node is released at the end of the DAPS-HO procedure (i.e., when the DAPS-HO is considered to be complete); and
- a subset Y1 ($Y1 \subset Y$) of target SCells which may be activated after the successful completion of the random access procedure for the target PCell.

Thus, the UE 300 may enable the source and target SCells during the DAPS-HO in a flexible manner.

Figure 6:
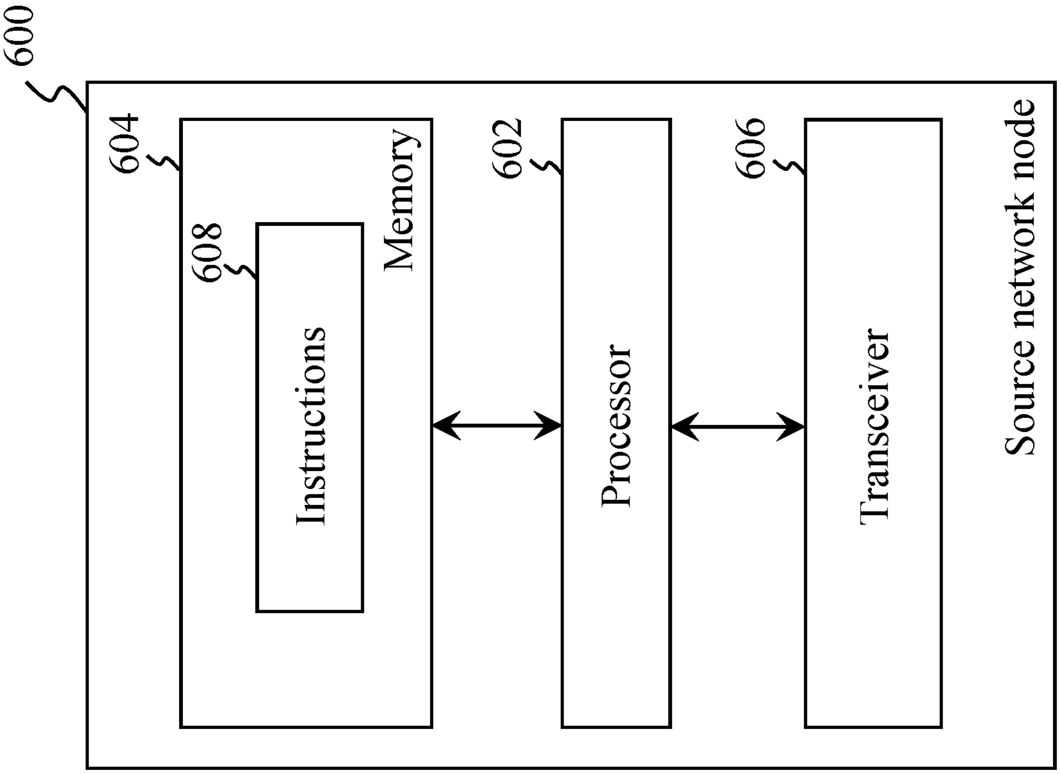
FIG. 6 shows a block diagram of a source network node in accordance with one example embodiment.

FIG. 6 shows a block diagram of a source network node 600 in accordance with one example embodiment. The source network node 600 is intended to communicate with the UE 300 and a target network node in any of the above-described wireless communication networks. As shown in FIG. 6, the source network node 600 comprises a processor 602, a memory 604, and a transceiver 606. The memory 604 stores processor-executable instructions 608 which, when executed by the processor 602, cause the processor 602 to implement the aspects of the present disclosure, as will be described below in more detail. It should be again noted that the number, arrangement, and interconnection of the constructive elements constituting the source network node 600, which are shown in FIG. 6, are not intended to be any limitation of the present disclosure, but merely used to provide a general idea of how the constructive elements may be implemented within the source network node 600. In general, the processor 602, the memory 604, the transceiver 606, and the processor-executable instructions 608 may be implemented in the same or similar manner as the processor 302, the memory 304, the transceiver 306, and the processor-executable instructions 308, respectively.

Figure 7:
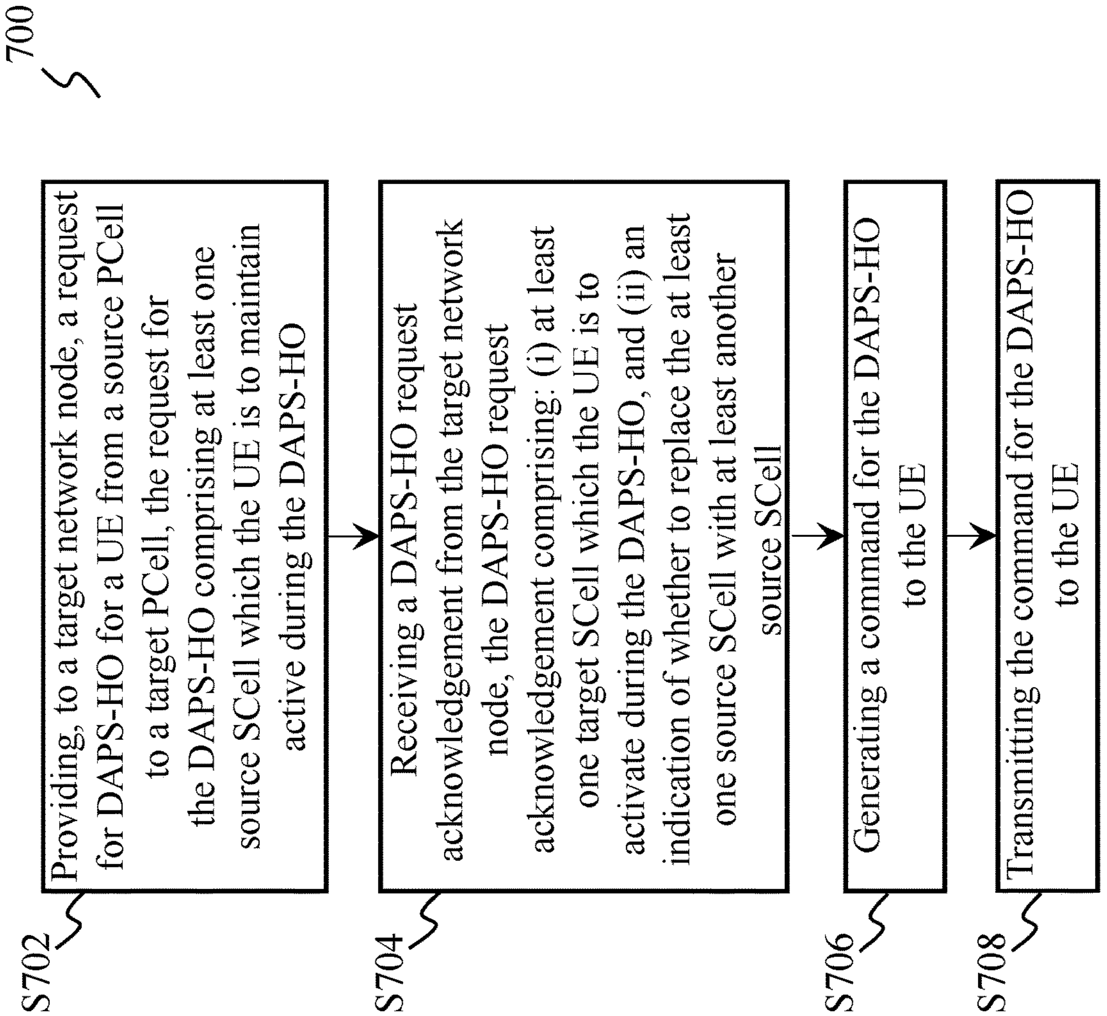
FIG. 7 shows a flowchart of a method for operating the source network node shown in FIG. 6 in accordance with one example embodiment.

FIG. 7 shows a flowchart of a method 700 for operating the source network node 600 in accordance with one example embodiment. The method 700 starts with a step S702, in which the processor 602 provides, to the target network node, a request for DAPS-HO for the UE 300 from the source PCell of the source network node 600 to the target PCell of the target network node. It is again assumed that the source network node 600 further comprises a set of source SCells configured for the UE 300, and the target network node further comprises a set of target SCells configured for the UE 300. The request for the DAPS-HO comprises one or more source SCells (e.g., the above-discussed subsets X1 and/or X2 of source SCells) which the UE 300 should maintain active during the DAPS-HO. Then, the method 700 proceeds to a step S704, in which the processor 602 receives a DAPS-HO request acknowledgement from the target network node. The DAPS-HO request acknowledgement comprises: (i) one or more target SCells (e.g., the above-discussed set Y1 of target SCells) which the UE 300 should configure and activate during the DAPS-HO, and (ii) and indication of whether the source network node 600 should replace the source SCells indicated in the request for the DAPS-HO with one or more other SCells of the set of source SCells. After that, the method 700 goes on to a step S706, in which the processor 602 generates the command for the DAPS-HO based on the DAPS-HO request acknowledgement. The command for the DAPS-HO indicates: (i) the target SCell(s) indicated in the DAPS-HO request acknowledgement, and (ii) the source SCell(s) initially indicated in the request for the DAPS-HO or the other source SCells indicated in the DAPS-HO request acknowledgement. Next, the method 700 proceeds to a step S708, in which the processor 602 transmits (e.g., by using the transceiver 606) the command for the DAPS-HO to the UE 300 (i.e., the processor 302). The step S708 may be performed, for example, by using a dedicated signaling (e.g., a RRC message).

In one example embodiment, the method 700 may comprise, before the step S702, an additional step, in which the processor 602 transmits transmit, to the UE 300 (i.e., the processor 302) a request for the UE capability (i.e., the maximum number of SCells that the UE 300 may maintain active during the DAPS-HO, and/or at least one SCell combination that the UE 300 may maintain during the DAPS-HO) and, in response to the request, receives the report on the UE capability.

Figure 8:
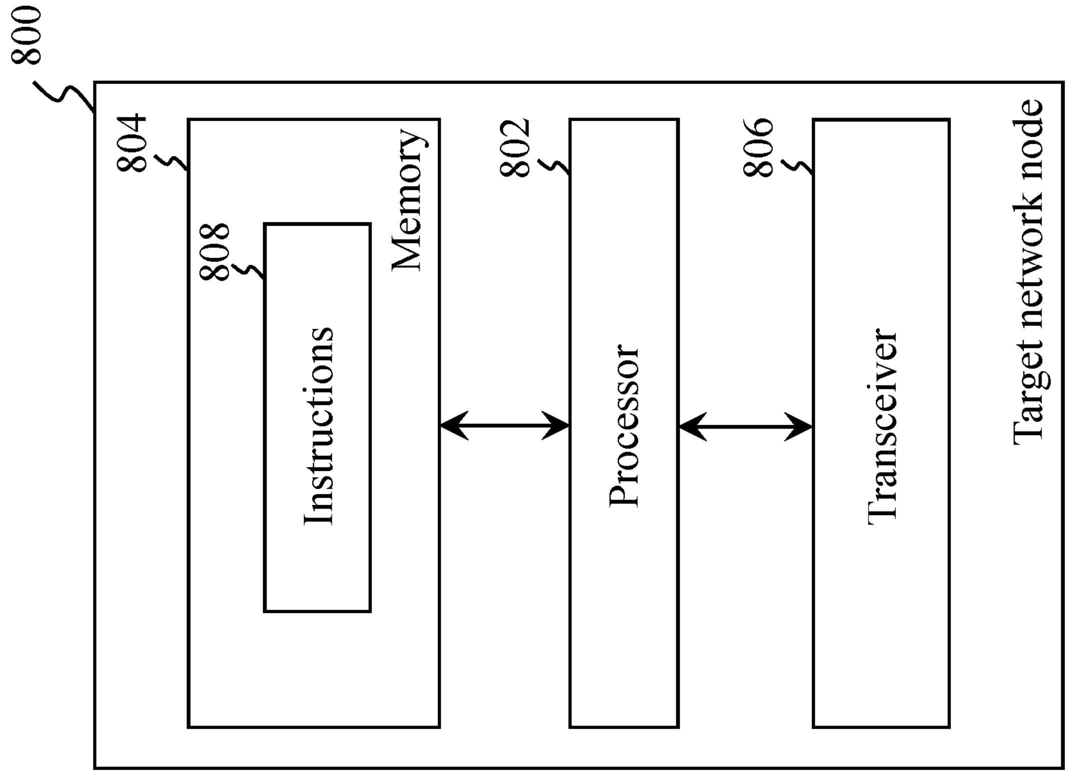
FIG. 8 shows a block diagram of a target network node in accordance with one example embodiment.

FIG. 8 shows a block diagram of a target network node 800 in accordance with one example embodiment. The target network node 800 is intended to communicate with the UE 300 and the source network node 600 in any of the above-described wireless communication networks. As shown in FIG. 8, the target network node 800 comprises a processor 802, a memory 804, and a transceiver 806. The memory 804 stores processor-executable instructions 808 which, when executed by the processor 802, cause the processor 802 to implement the aspects of the present disclosure, as will be described below in more detail. It should be again noted that the number, arrangement, and interconnection of the constructive elements constituting the target network node 800, which are shown in FIG. 8, are not intended to be any limitation of the present disclosure, but merely used to provide a general idea of how the constructive elements may be implemented within the target network node 800. In general, the processor 802, the memory 804, the transceiver 806, and the processor-executable instructions 808 may be implemented in the same or similar manner as the processor 302, the memory 304, the transceiver 306, and the processor-executable instructions 308, respectively.

Figure 9:
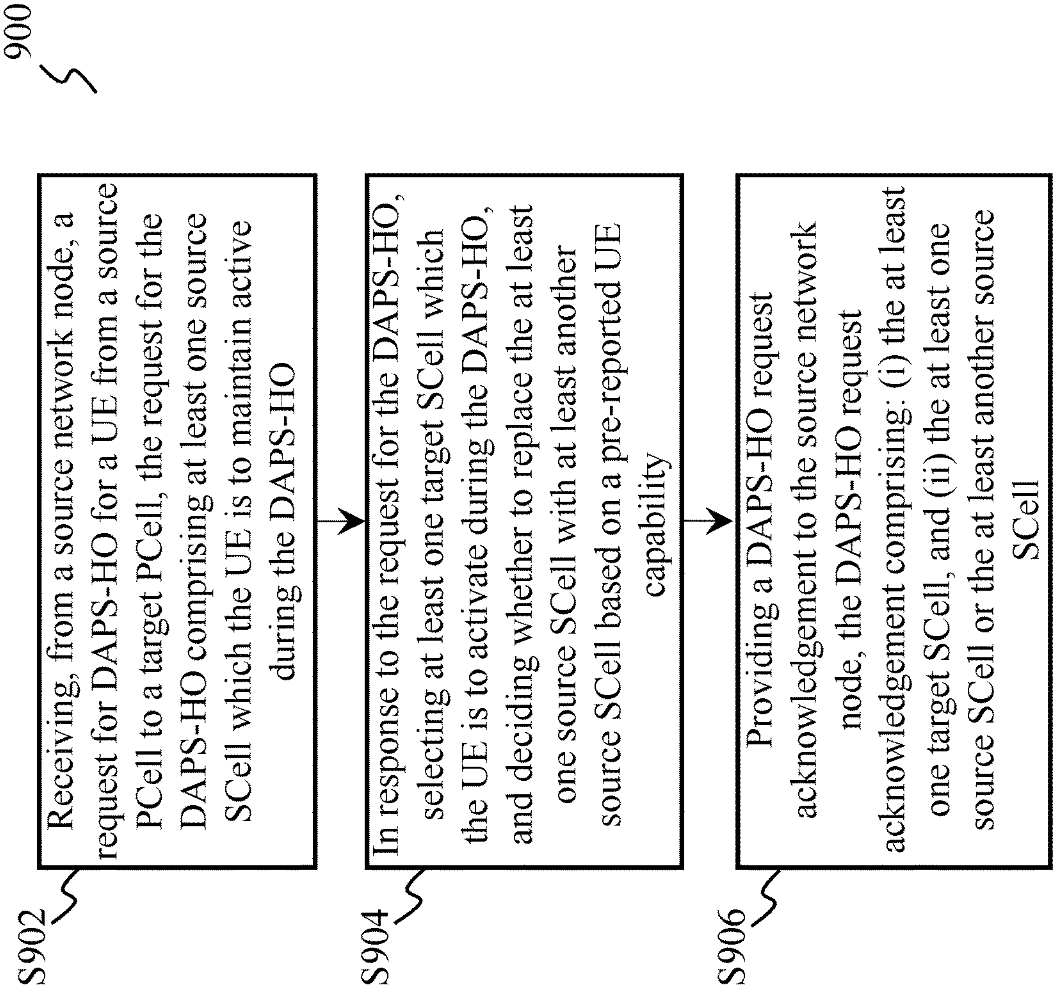
FIG. 9 shows a flowchart of a method for operating the target network node shown in FIG. 8 in accordance with one example embodiment.

FIG. 9 shows a flowchart of a method 900 for operating the target network node 800 in accordance with one example embodiment. The method 900 starts with a step S902, in which the processor 802 receives, from the source network node 600, the request for the DAPS-HO for the UE 300 from the source PCell to the target PCell. As noted above, the request for the DAPS-HO comprises the source SCell(s) which the UE 300 should maintain active during the DAPS- HO. Then, the method 900 proceeds to a step S904, in which the processor 802, in response to the request for the DAPS-HO, selects the target SCell(s) which the UE 300 should activate during the DAPS-HO, as well as decides whether it is required to replace the source SCell(s) indicated in the request for the DAPS-HO with one or more other source SCells of the set of source SCells configured for the UE 300. Such a decision is made based on the SCell combinations and/or the number of SCells that are allowed by the UE capability (i.e., may be maintained by the configuration of the UE 300). For example, the source network node 600 may indicate, in the request for the DAPS-HO, the source SCell which is not allowed to operate with the target SCell selected by the target network node 800. The UE capability may be reported by the UE 300 or the source network node 600 to the target network node 800 in advance, for example, before the DAPS-HO, or during the DAPS-HO. After that, the method 900 goes on to a step S906, in which the processor 802 provides the DAPS-HO request acknowledgement to the source network node 600. As noted earlier, the DAPS-HO request acknowledgement comprises: (i) the target SCell(s) which the UE 300 should activate during the DAPS-HO, and (ii) the indication of whether to replace the source SCell(s) indicated in the request for the DAPS-HO with the other SCell(s). The source network node 600 may adapt the source SCell(s) accordingly based on the indication from the target network node 800, which is comprised in the DAPS-HO request acknowledgement.

In one example embodiment, the method 900 may comprise an additional step, in which the processor 802 generates an SCell combination table that comprises multiple SCell combinations configured for the UE 300. Each of the multiple SCell combinations may comprise one or more source SCells of the set of source SCells and one or more target SCells of the set of target SCells. Moreover, each of such SCell combinations may be provided with its own table index. The SCell combination table may be generated, for example, based on the maximum number of SCells that the UE 300 may maintain active during the DAPS-HO, and/or preferred combinations of the source and target SCells. The processor 802 should ensure that all the entries of the SCell combination table are within the UE capability for the DAPS-HO. The processor 802 may indicate the SCell combination table as an additional parameter to the processor 602 in the DAPS-HO request acknowledgement. The SCell combination table may be further provided to the UE 300 either from the source network node 600 or the target network node 800 by using a dedicated signaling (e.g., a new RRC message or together with the command for the DAPS-HO). In turn, the processor 302 of the UE 300 may be configured to select, from the SCell combination table, a SCell combination for the DAPS-HO, maintain the source SCell(s) of the selected SCell combination active during the DAPS-HO, and activate the target SCell(s) of the selected SCell combination during the DAPS-HO. In one example embodiment, such a selection of the SCell combination may be made based on a selected table index additionally reported by the source network node 600 or the target network node 900 to the UE 300 either together with the command for the DAPS-HO, or by using a new RRC message or a MAC-CE, for example.

Furthermore, the source network node 600 may use the table indices to switch the 'SCell operation' during the DAPS-HO, if required. In this case, the source network node 600 may inform the UE 300 about the table index of the SCell combination to be used instead of the previously selected one. The UE 300 may further indicate this table index to the target network node 800, for example, as part of the RRC reconfiguration complete message which is sent to the target network node 800 after the successfully completed random access procedure (as discussed above with reference to FIG. 2 and will be discussed again below with reference to FIG. 10), or as the MAC-CE. Alternatively, the source network node 600 may inform the target network node 800 about this table index via a message sent, for example, over an X2/Xn interface.

In turn, the target network node 800 may decide to change the 'SCell operation' (i.e., the SCell combination) during the DAPS-HO by switching the table index, for example, prior to the source PCell is released, depending on the radio condition of the source and target SCells. If the source network node and the target network node are co-located in the same network node (e.g., the same gNB), the source network node 600 may immediately switch to the table index that is selected by the target network node 800; otherwise, the target network node 800 may inform the source network node 600 about the selected table index over the Xn/X2 interface (this would require measurements to be forwarded to the target network node 800 or require the target network node 800 to directly know the measurements from the UE 300).

Figure 10:
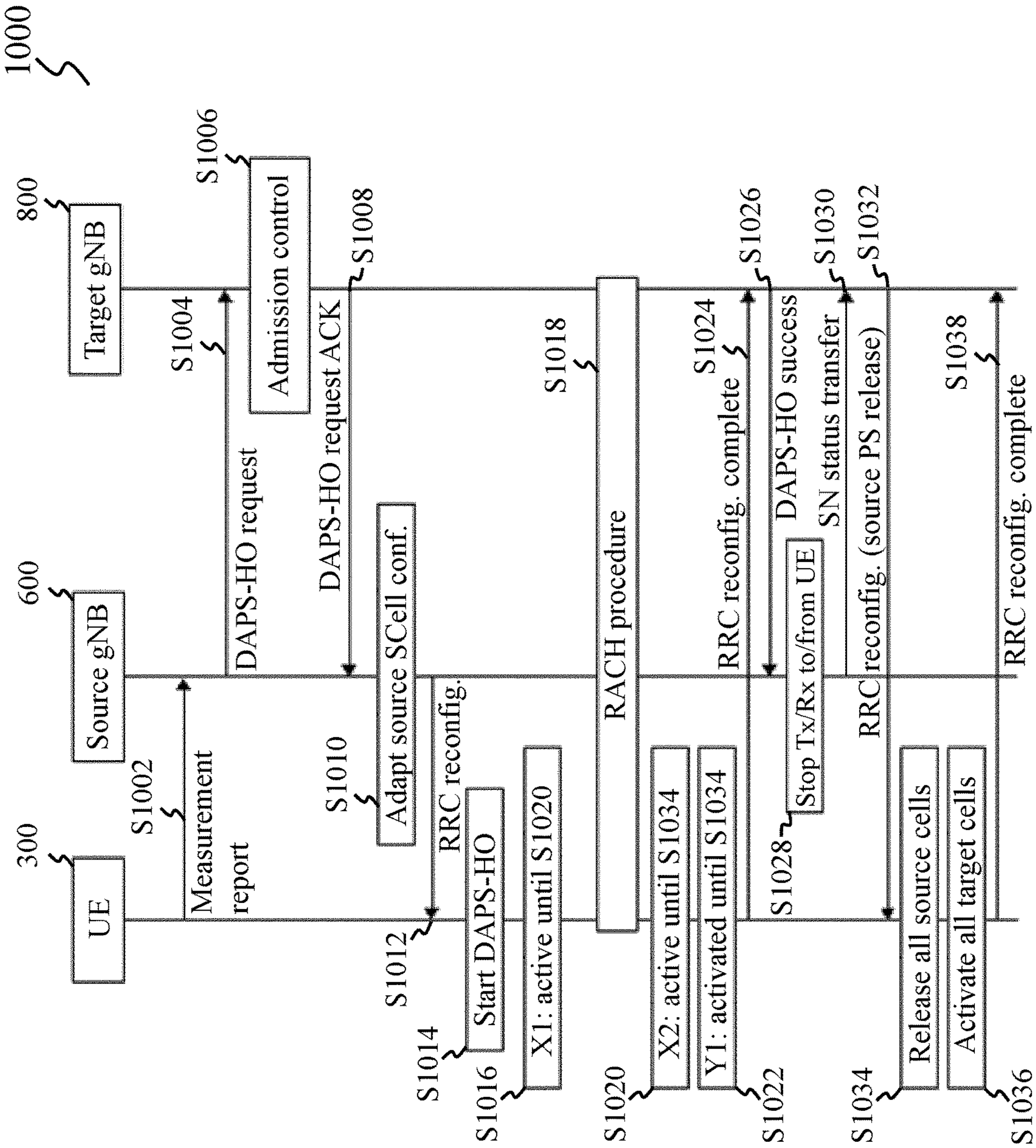
FIG. 10 shows an interaction diagram that explains the interaction between the UE shown in FIG. 3, the source network node shown in FIG. 6, and the target network node shown in FIG. 8 in accordance with a first example embodiment.

FIG. 10 shows an interaction diagram 1000 that explains the interaction between the UE 300, the source network node 600, and the target network node 800 in accordance with a first example embodiment. It is assumed that each of the source network node 600 and the target network node 800 is implemented as a gNB, and the command for the DAPS-HO should indicate the parameters which are discussed above with reference to FIG. 5 (i.e., X1, X2, and Y1). It is also worth noting that user plane data are transmitted and received at both the source and target gNBs 600 and 800 during the DAPS-HO. The interaction diagram 1000 starts with a step S1002, in which the UE 300 reports a measurement report to the source gNB 600 according to pre-configured measurement procedures. According to the measurement report (and RRM information, if available), the source gNB 600 decides to initiate the DAPS-HO of the UE 300. For this purpose, the source gNB 600 sends the DAPS-HO request to the target gNB 800 in a step S1004. The DAPS-HO request comprises a transparent RRC container with necessary information (for example, the indication of X1 and/or X2, the indication of the maximum number of SCells that the UE 300 may maintain active during the DAPS-HO, etc.) to prepare the DAPS-HO at the target gNB 800. The target gNB 800 uses to this information to perform DAPS-HO admission control in a step S1006. Further, the interaction diagram 1000 proceeds to a step S1008, in which the target gNB 800 prepares and sends the DAPS-HO request acknowledgement to the source gNB 600, which comprises a transparent container (with the DAPS configuration including the indication of Y1, the indication of whether to modify X1 and/or X2, and, if required, the SCell combination table) to be sent to the UE 300 as the RRC reconfiguration message to execute the DAPS-HO. The target gNB 800 may also indicate if the DAPS-HO for the UE 300 is accepted. In a next step S1010, the source gNB 600 determines that it is required to modify (e.g., reduce) the subsets X1 and/or X2 of source SCells based on the DAPS-HO request acknowledgement from the target gNB 800. When the subsets X1 and/or X2 of source SCells is/are modified, the source gNB 600 sends the command for the DAPS-HO as the RRC Reconfiguration message to the UE 300 in a step S1012. The interaction diagram 1000 further proceeds to a step S1014, in which the UE 300 starts executing the DAPS-HO in response to the received command for the DAPS-HO. More specifically, in a step S1016, the UE 300 continues using the subset X1 of source SCells until the RACH procedure for the target PCell performed in a step S1018 is successfully completed. Then, the UE 300 switches from the subset X1 of source SCells to the subset X2 of source SCells in a next step 1020 (i.e., after the RACH procedure is successfully completed). In a step S1022, the UE 300 activates the subset Y1 of target SCells (the UE 300 will use only these target SCells until the source PCell is released in a step S1034). After that, the interaction diagram 1000 proceeds to steps S1024-S1032 which are part of the conventional DAPS-HO procedure described above with reference to FIG. 2. In particular, the steps S1024-S1032 are similar to the steps S216-S224, respectively. In a step S1034, the UE 300 releases the source PCell by releasing the PS configuration of the source gNB 600, thereby terminating the DAPS-HO. At the same time, in a step S1036, the UE 300 upgrades the subset Y1 of target SCells to the full set Y of target SCells (which may be also reported to the UE 300 in the step S1012). The UE 300 sends an RRC reconfiguration complete message indicative of said release and said upgrade to the target gNB 800 in a step S1038. After that, the interaction diagram 200 ends up, and the UE 300 may continue user plane communication with the target gNB 800.

Figure 11:
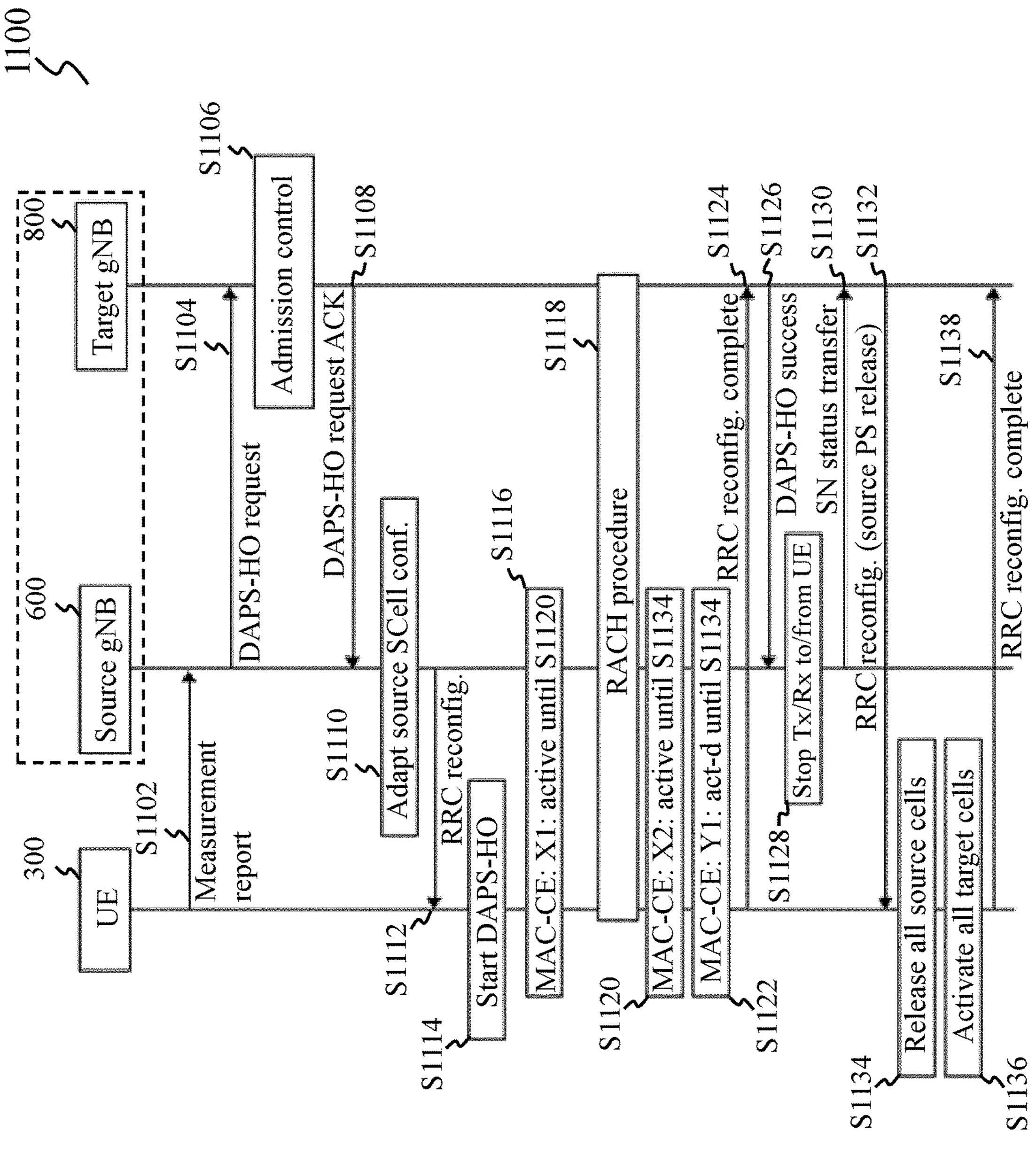
FIG. 11 shows an interaction diagram that explains the interaction between the UE shown in FIG. 3, the source network node shown in FIG. 6, and the target network node shown in FIG. 8 in accordance with a second example embodiment.

FIG. 11 shows an interaction diagram 1100 that explains the interaction between the UE 300, the source network node 600, and the target network node 800 in accordance with a second example embodiment. It is again assumed that each of the source network node 600 and the target network node 800 is implemented as a gNB, and the command for the DAPS-HO should indicate the parameters which are discussed above with reference to FIG. 5 (i.e., X1, X2, and Y1). At the same time, unlike the interaction diagram 1000, it is further assumed in the interaction diagram 110 that the source and target gNBs 600 and 800 are co-located within the same network node (this is schematically shown by using the dashed box in FIG. 11). Such a co-location of the source and target gNBs 600 and 800 allows using a MAC-CE to cause the UE 300 to employ the subsets X1, X2, and Y1 during the DAPS-HO. Due to this co-location, the source and target PCells and SCells are under the control of the same network node, thereby allowing communications between the source and target gNBs 600 and 800 without requiring an external interface like the interface X2/Xn. This may further improve the overall throughput of the UE 300 on an air interface as the selection of the SCell(s) (i.e., SCell activation/deactivation/release) at the source and target gNBs 600 and 800 may be controlled more precisely because radio measurements from the UE 300 are jointly available at the source and target gNBs 600 and 800 (which improves the decision-making process regarding the selection of the SCell(s)). In general, steps S1102-S1114, S1118, S1124-S1138 of the interaction diagram 1100 are similar to the steps S1002-S1014, S1018, S1024-S1038 of the interaction diagram 1000, respectively. The only difference of the interaction diagrams 1100 from 1000 is that the subsets X1, X2, and Y1 are reported to the UE 300 in steps S1116, S1120, and S1122, respectively (in the interaction diagram 1000, these subsets are reported to the UE 300 together with the command for the DAPS-HO in the step S1012).

It should be noted that each step or operation of the methods 400, 700, 900, and the interaction diagrams 1000 and 1100, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 302, 602, and 802, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A user equipment (UE) for wireless communications, comprising:

at least one processor; and at least one memory including a computer program code;

wherein the at least one memory and the computer program code are configured to, with the at least one processor, cause the UE at least to:

receive, from a source network node, a command for dual active protocol stack handover (DAPS-HO) from a source primary cell (PCell) of the source network node to a target PCell of a target network node, the source network node further comprising a set of source secondary cells (SCells) configured for the UE, the target network node further comprising a set of target SCells configured for the UE, the command for the DAPS-HO causing the UE to:

maintain, among the set of source SCells, at least one source SCell active during the DAPS-HO; and activate, among the set of target SCells, at least one target SCell during the DAPS-HO; and execute the DAPS-HO based on the received command for the DAPS-HO, wherein the at least one memory and the computer program code are further configured to, with the at least one processor, cause the UE to execute the DAPS-HO by:

performing a random access procedure for the target PCell;

after the random access procedure is successfully completed, receiving, from the target network node, a release message for the source PCell; and in response to the release message, releasing the source PCell and the at least one source SCell, wherein the command for the DAPS-HO further causes the UE to:

maintain, among the set of source SCells, a first subset of source SCells active upon receiving the command for the DAPS-HO until the random access procedure for the target PCell is successfully completed; and maintain, among the set of source SCells, a second subset of source SCells active after the successfully completed random access procedure until the release message for the source PCell is received from the target network node, wherein the second subset of source SCells is part of the first subset of source SCells.

2. The UE of claim 1, wherein the at least one memory and the computer program code are further configured to, with the at least one processor, cause the UE to receive the command for the DAPS-HO by using a dedicated signaling from the source network node.

3. The UE of claim 1, wherein the first subset of source SCells is the same as the second subset of source SCells.

4. The UE of claim 1, wherein the command for the DAPS-HO further causes the UE to:

configure a subset of target SCells from the set of target SCells upon receiving the command for the DAPS-HO;

activate the subset of target SCells after the successfully completed random access procedure; and activate the remaining target SCells from the set of target SCells upon receiving the release message for the source PCell from the target network node.

5. The UE of claim 1, wherein the command for the DAPS-HO further causes the UE to configure and activate the set of target SCells during the DAPS-HO.

6. The UE of claim 1, wherein the at least one memory and the computer program code are further configured to, with the at least one processor, cause the UE, before receiving the command for the DAPS-HO, to:

receive, from the source network node or the target network node, a request for a UE capability, the UE capability comprising: (i) a maximum number of SCells that the UE is able to maintain active simultaneously, and/or (ii) at least one SCell combination that the UE is able to maintain; and report the UE capability to the source network node or the target network node.

7. The UE of claim 1, wherein the command for the DAPS-HO comprises a SCell combination table that comprises multiple SCell combinations configured for the UE, each of the multiple SCell combinations comprising at least one source SCell of the set of source SCells and at least one target SCell of the set of target SCells, and wherein the at least one memory and the computer program code are further configured to, with the at least one processor, cause the UE to:

select, among the multiple SCell combinations, a SCell combination for the DAPS-HO;

maintain the at least one source SCell of the selected SCell combination active during the DAPS-HO, and activate the at least one target SCell of the selected SCell combination during the DAPS-HO.

8. The UE of claim 7, wherein each of the multiple SCell combinations is provided with a table index in the SCell combination table, and wherein the at least one memory and the computer program code are further configured to, with the at least one processor, cause the UE to select the SCell combination for the DAPS-HO by:

receiving, from the source network node or the target network node, a selected table index among the table indices of the SCell combination table; and selecting the SCell combination for the DAPS-HO based on the selected table index.

9. The UE of claim 8, wherein the at least one memory and the computer program code are further configured to, with the at least one processor, cause the UE, to notify the target network node about the selected table index if the selected table index is received from the source network node.

10. The UE of claim 8, wherein the at least one memory and the computer program code are further configured to, with the at least one processor, cause the UE to receive the selected table index by using a Media Access Control (MAC)-Control Element (CE).

11. A source network node in a wireless communication network, comprising:

at least one processor; and at least one memory including a computer program code;

wherein the at least one memory and the computer program code are configured to, with the at least one processor, cause the source network node at least to:

provide, to a target network node in the wireless communication network, a request for dual active protocol stack handover (DAPS-HO) for a user equipment (UE) from a source primary cell (PCell) of the source network node to a target PCell of the target network node, the source network node further comprising a set of source secondary cells (SCells) configured for the UE, the target network node further comprising a set of target SCells configured for the UE, the request for the DAPS-HO comprising at least one source SCell of the set of source SCells which the UE is to maintain active during the DAPS-HO;

receive a DAPS-HO request acknowledgement from the target network node, the DAPS-HO request acknowledgement comprising: (i) at least one target SCell of the set of target SCells which the UE is to activate during the DAPS-HO, and (ii) an indication of whether the source network node is to replace the at least one source SCell indicated in the request for the DAPS-HO with at least another source SCell of the set of source SCells; and based on the DAPS-HO request acknowledgement, generate a command for the DAPS-HO, the command for the DAPS-HO indicating: (i) the at least one target SCell, and (ii) the at least one source SCell indicated in the request for the DAPS-HO or the at least another source SCell; and transmit, to the UE, the command for the DAPS-HO.

12. The source network node of claim 11, wherein the at least one memory and the computer program code are further configured to, with the at least one processor, cause the source network node to transmit the command for the DAPS-HO by using a dedicated signaling to the UE.

13. The source network node of claim 11, wherein the at least one memory and the computer program code are further configured to, with the at least one processor, cause the source network node, before transmitting the request for the DAPS-HO to the target network node, to:

transmit, to the UE, a request for a UE capability, the UE capability comprising: (i) a maximum number of SCells that the UE is able to maintain active simultaneously, and/or (ii) at least SCell combination that the UE is able to maintain;

receive the a report on the UE capability from the UE; and provide the report on the UE capability to the target network node.

14. The source network node of claim 11, wherein the at least one source SCell comprises:

a first subset of source SCells which the UE is to maintain active upon receiving the command for the DAPS-HO until a random access procedure for the target PCell is successfully completed in accordance with the DAPS-HO; and a second subset of source SCells which the UE is to maintain active after the successfully completed random access procedure until the UE receives a release message for the source PCell from the target network node in accordance with the DAPS-HO.

15. The source network node of claim 14, wherein the at least one target SCell comprises a subset of target SCells which the UE is to configure upon receiving the command for the DAPS-HO and activate after the successfully completed random access procedure, and wherein the command for the DAPS-HO causes the UE to activate the remaining target SCells from the set of target SCells upon receiving the release message for the source PCell from the target network node.

16. The source network node of claim 11, wherein the command for the DAPS-HO causes the UE to activate the set of target SCells during the DAPS-HO.

17. A method for operating a user equipment (UE) for wireless communications, comprising:

receiving, from a source network node, a command for dual active protocol stack handover (DAPS-HO) from a source primary cell (PCell) of the source network node to a target PCell of a target network node, the source network node further comprising a set of source secondary cells (SCells) configured for the UE, the target network node further comprising a set of target SCells configured for the UE, the command for the DAPS-HO causing the UE to:

maintain, among the set of source SCells, at least one source SCell active during the DAPS-HO; and activate, among the set of target SCells, at least one target SCell during the DAPS-HO; and executing the DAPS-HO based on the received command for the DAPS-HO, wherein the command for the DAPS-HO comprises a SCell combination table that comprises multiple SCell combinations configured for the UE, each of the multiple SCell combinations comprising at least one source SCell of the set of source SCells and at least one target SCell of the set of target SCells, and further causing the UE to:

select, among the multiple SCell combinations, a SCell combination for the DAPS-HO:

maintain the at least one source SCell of the selected SCell combination active during the DAPS-HO, and activate the at least one target SCell of the selected SCell combination during the DAPS-HO.

* * * * *